(12) United States Patent
Maurer et al.

(10) Patent No.: US 9,969,039 B2
(45) Date of Patent: May 15, 2018

(54) STEADY REST

(71) Applicant: SMW-Autoblok Spannsysteme GmbH, Meckenbeuren (DE)

(72) Inventors: Eckhard Maurer, Oberteuringen (DE); Jürgen Marquart, Markdorf (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 0 days. days.

(21) Appl. No.: 15/147,647

(22) Filed: May 5, 2016

(65) Prior Publication Data
US 2016/0332271 A1 Nov. 17, 2016

(30) Foreign Application Priority Data
May 12, 2015 (EP) .................................... 15167237

(51) Int. Cl.
*B23Q 1/76* (2006.01)
*B24B 41/06* (2012.01)

(52) U.S. Cl.
CPC .......... *B23Q 1/76* (2013.01); *B23Q 2240/007* (2013.01); *B24B 41/06* (2013.01); *Y10T 82/2593* (2015.01); *Y10T 82/2597* (2015.01)

(58) Field of Classification Search
CPC .... B24B 41/06; B23Q 1/76; B23Q 2240/007; Y10T 82/2593; Y10T 82/2597
(Continued)

(56) References Cited

U.S. PATENT DOCUMENTS 4,463,635 A * 8/1984 Hafla ........................ B23Q 1/76
294/116
4,519,279 A * 5/1985 Ruggeri ................... B23Q 1/76
294/116
(Continued)

FOREIGN PATENT DOCUMENTS

DE 3543806 6/1987
DE 4238616 A1 * 5/1994 ............... B23Q 1/76
(Continued)

*Primary Examiner* — Sunil K Singh
*Assistant Examiner* — Nicole N Ramos
(74) *Attorney, Agent, or Firm* — Pandiscio & Pandiscio

(57) ABSTRACT

In a steady rest (1) for centring a rotationally symmetrical workpiece (2) in the space, consisting of: two housing halves (4, 5) arranged at a distance from one another and firmly connected together, a middle steady rest arm (6) arranged between the two housing shells (4, 5) that is mounted in the housing shells (4, 5) by means of an actuation piston (7) so as to be moved in an axial direction (3) towards the workpiece (2), and two outer steady rest arms (11, 12) that are in a driving connection with the middle steady rest arm (6) by means of a guide slide (13) which has a control track (14) on two opposite outside sides, on which a roller (16) attached to the free ends (15) of both outer steady rests (11, 12) is arranged which roll along the control track (14), workpieces (2) with different diameters should be held in the space. This is achieved in that the particular control track (14) of the guide slide (13) has at least two control sections (21, 22, 25) and that at least two rollers (16) spaced apart from one another are provided on the particular outer steady rest arm (11, 12), which are in an active contact with one each of the control sections (21, 22, 25) depending on the position of the guide slide (13) in the housing shells (4, 5).

12 Claims, 5 Drawing Sheets

(58) Field of Classification Search
USPC .......... 82/162, 164; 451/408, 406; 192/56.1; 464/37; 279/108
See application file for complete search history.

(56) References Cited

U.S. PATENT DOCUMENTS

| | | | | | |
|---|---|---|---|---|---|
| 4,546,681 | A | * | 10/1985 | Owsen | B23Q 1/76 294/116 |
| 4,754,673 | A | * | 7/1988 | Hiestand | B23Q 1/76 82/162 |
| 5,237,780 | A | * | 8/1993 | Lessway | B23Q 1/76 451/408 |
| 5,481,951 | A | * | 1/1996 | Kiefer | B23Q 1/76 82/162 |
| 5,860,341 | A | * | 1/1999 | Visigalli | B23Q 1/76 279/133 |
| 6,458,022 | B1 | * | 10/2002 | Folz | B23Q 1/76 269/196 |
| 8,266,992 | B2 | * | 9/2012 | Rehm | B23Q 1/76 451/408 |
| 8,286,955 | B2 | * | 10/2012 | Damang | B23Q 1/76 269/165 |
| 2013/0014620 | A1 | * | 1/2013 | Hangleiter | B23Q 1/76 82/164 |

FOREIGN PATENT DOCUMENTS

| | | | |
|---|---|---|---|
| EP | 2058084 A1 * | 5/2009 | ............... B23Q 1/76 |
| EP | 2540438 | 1/2013 | |
| EP | 2848359 | 3/2015 | |

* cited by examiner

STEADY REST

REFERENCE TO PENDING PRIOR PATENT APPLICATION

This patent application claims benefit of European Patent Application No. 15 167 237.5, filed May 12, 2015, which patent application is hereby incorporated herein by reference.

FIELD OF THE INVENTION

The present invention relates to a steady rest in accordance with the pre-characterising clause of patent claim 1.

BACKGROUND OF THE INVENTION

Steady rests of this kind have been disclosed, for example, in EP 2848359 A1, by means of which a rotationally symmetrical workpiece is centred in the space and supported. Workpieces of this kind are shafts or hollow bodies, the outer jacket surface of which is to be machined using tools thereby generating considerable machining forces that act on the clamped workpiece and cause it to undergo flexure. Often, workpieces of this kind are several meters in length, as a result of which the steady rests required for supporting the workpieces are arranged at a specified spacing from one another in the area of the machine tool bed of a machine tool.

The machine tool bed of a machine tool only provides a limited space, however, which needs to accommodate additional elements as a result of which the size of the steady rest must be adapted to the available space in the machine tool. Furthermore, the steady rests must be aligned offset in a vertical direction or to the side by a slight amount in relation to the machine tool in order to encompass and centre the workpiece to be held from underneath.

The steady rests designed for this purpose chiefly consist of two housing shells in which three steady rest arms are arranged and can be moved. The steady rest arms are in a driving, active connection with a pneumatically or hydraulically operated pressure piston, by means of which the three steady rest arms can be moved synchronously using a guide slide in the direction of the workpiece to be clamped or away from it.

The middle steady rest arm is moved axially to and fro accordingly and the two outer steady rest arms make contact with the outside of the guide slide and perform a swivelling movement when the guide slide is actuated. This is because a control track is worked onto two opposite outside parts of the guide slide, and one of the free ends of each outer steady rest arm makes contact with this by means of arranged rollers, and thereby roll along the control track. The advance movement of the guide slide consequently causes the two outer steady rest arms, which are mounted on the housing shells in a rotating arrangement, to be moved towards or swivelled away from the workpiece.

As soon as the three steady rest arms encounter the surface of the workpiece simultaneously, clamping forces are applied by means of which the workpiece is held.

The greater the diameter of the workpiece to be clamped, the larger the size of the steady rest because in that case significant swivel angles are required for the two outer steady rest arms, and also the axial advance movement of the pressure piston and the middle steady rest arm must be increased in size accordingly. The space available inside a machine tool is limited, however, and it is necessary not only to make the steady rest as small as possible so as to provide additional space for other technical tasks on the machine tool, but also for the steady rest to provide the greatest possible swivelling range for the steady rest arms so that workpieces of different sizes and configurations can be clamped without the need for the steady rests to be installed and removed on a continuous basis if the diameter of the workpiece to be clamped is reduced or increased.

SUMMARY OF THE INVENTION

Therefore, it is the task of the present invention to develop a steady rest of the aforementioned type which enables workpieces with different diameters to be held and centred, and so the space taken up by the steady rest is as small as possible while the workpieces with different diameters can still be gripped and supported.

In accordance with the present invention, these tasks are accomplished by the features of the characterising part of patent claim 1.

Other advantageous further embodiments of the present invention are derived from the subordinate claims.

The particular control track of the guide slide has at least two control sections, and at least two rollers are arranged spaced apart from one another on the particular outer steady rest arm, in which case the rollers are in active contact with one of the control sections in each case depending on the position of the guide slide in the housing shells, meaning that the space taken up by the steady rest is achieved while retaining the greatest possible swivelling range of the outer steady rest arms because the alignment of the particular control sections of the control track depends on the advance position of the guide slide, as a result of which the steady rest arms, and in particular the two outer steady rest arms, move through the greatest possible swivelling range and can thus clamp workpieces of different sizes.

The rollers of the particular outer steady rest arms are in permanent contact either individually or in pairs with one of the control sections allocated to each of the rollers, which means that the steady rest arms are in a permanent driving connection with the guide slide, as a result of which the steady rest arms can be moved both in the direction of the workpiece and in the opposite direction. The guide slide thus not only acts as an advance element but also as a retract device for the three steady rest arms.

As a result of the design embodiment of the control tracks, in particular the transitional area between two adjacent control tracks, the situation is achieved in which the rollers make contact either individually or in pairs with two adjacent control sections, as a result of which an even movement of the guide slide is possible with differently sized swivelling paths of the two outer steady rest arms because the corresponding control sections are at different angles in relation to one another, or are aligned differently in relation to the longitudinal axis of the housing shells.

BRIEF DESCRIPTION OF THE DRAWINGS

The drawing shows two sample embodiments of a steady rest configured in accordance with the present invention, the details of which are explained below. In the drawing.

DETAILED DESCRIPTION OF THE INVENTION

Figure 1:
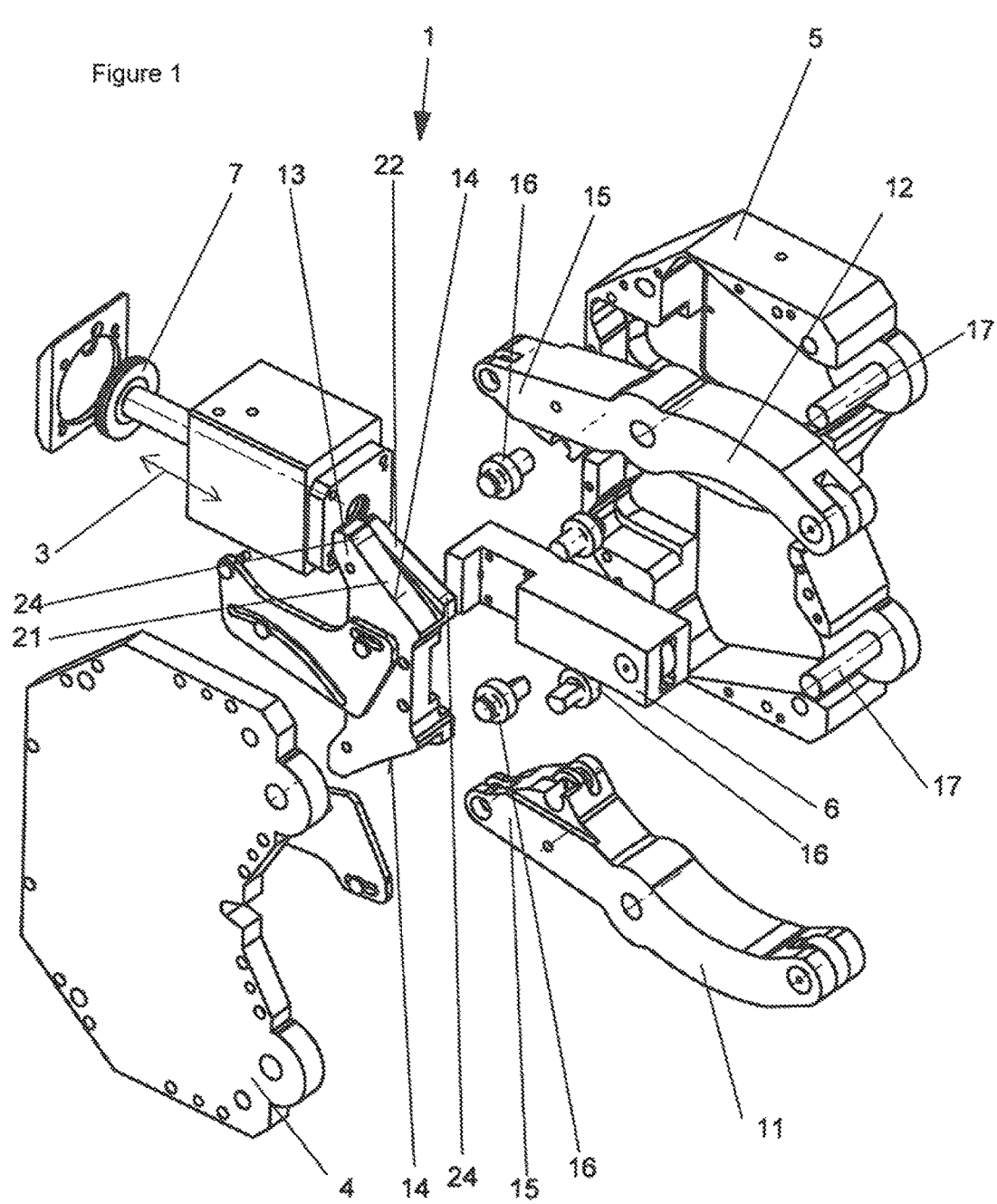
FIG. 1 shows a first sample embodiment of a steady rest with two housing shells, between which an actuation piston, a guide slide and a middle steady rest arm attached to this are mounted in an axially moving arrangement, and with two outer steady rest arms that are in a driving connection with the guide slide, in a perspective and an exploded view.

FIG. 1 shows a steady rest 1 by means of which a workpiece 2 is centred or held in the space, in such a way that the longitudinal axis of the workpiece 2 runs in the straightest possible line, i.e. without bowing. The workpieces 2 are rotationally symmetrical shafts or hollow bodies that are machined by a machine tool which is not illustrated. Often, the machine tool exerts considerable machining forces on the workpiece 2 and these must be absorbed by the steady rest 1 without the longitudinal axis of the workpiece 2 being shifted, since if that happened the precise machining steps would not be able to be achieved.

The steady rest 1 consists of two housing shells 4 and 5 which are arranged at a distance from one another and enclose a space. The housing shells 4 and 5 are firmly connected together. Furthermore, the housing shells 4 and 5 form a longitudinal axis 10 which must be aligned at right angles to the axis of rotation of the workpiece 2 in order to achieve a reliable attachment of the steady rest 1 on the workpiece 2.

Furthermore, the steady rest 1 consists of an actuation piston 7 which is acted upon by a pneumatic or hydraulic pressurised medium, for example, and runs flush with the longitudinal axis 10 of the housing shells 4, 5. The actuation piston 7 generates an axial stroke movement aligned in the direction of the workpiece 2 or away from it, and which is identified with the reference number 3 in the figures.

The actuation piston 7 has a middle steady rest arm 6 attached to it, which is thus in a driving active connection with the actuation piston 7, and can be moved by it in the movement direction 3 axially towards the workpiece 2 or away from it. The middle steady rest arm 6 consequently forms a first support for the workpiece 2.

Two further supports required by the middle steady rest arm 6 are formed by two outer steady rest arms 11, 12 which are mounted in a rotating or sliding arrangement by means of a joint 17 on the housing shells 4 and 5.

In order to move the two outer steady rest arms 11, 12 synchronously with the middle steady rest arm 6, the actuation piston 7 has a guide slide 13 attached to it with a roof-shaped or V-shaped outer contour, in which case the tip of the roof or of the V is arranged adjacent to the workpiece 2 and the side surfaces of the guide slide 13 rise in relation to the longitudinal axis 10.

The opposite outer flanks of the guide slide 13 are configured as a control track 14 along which rollers 16 attached to each of the free ends 15 of the outer steady rest arms 11, 12 roll and are in permanent contact, as is explained in more detail below.

Figure 2A:
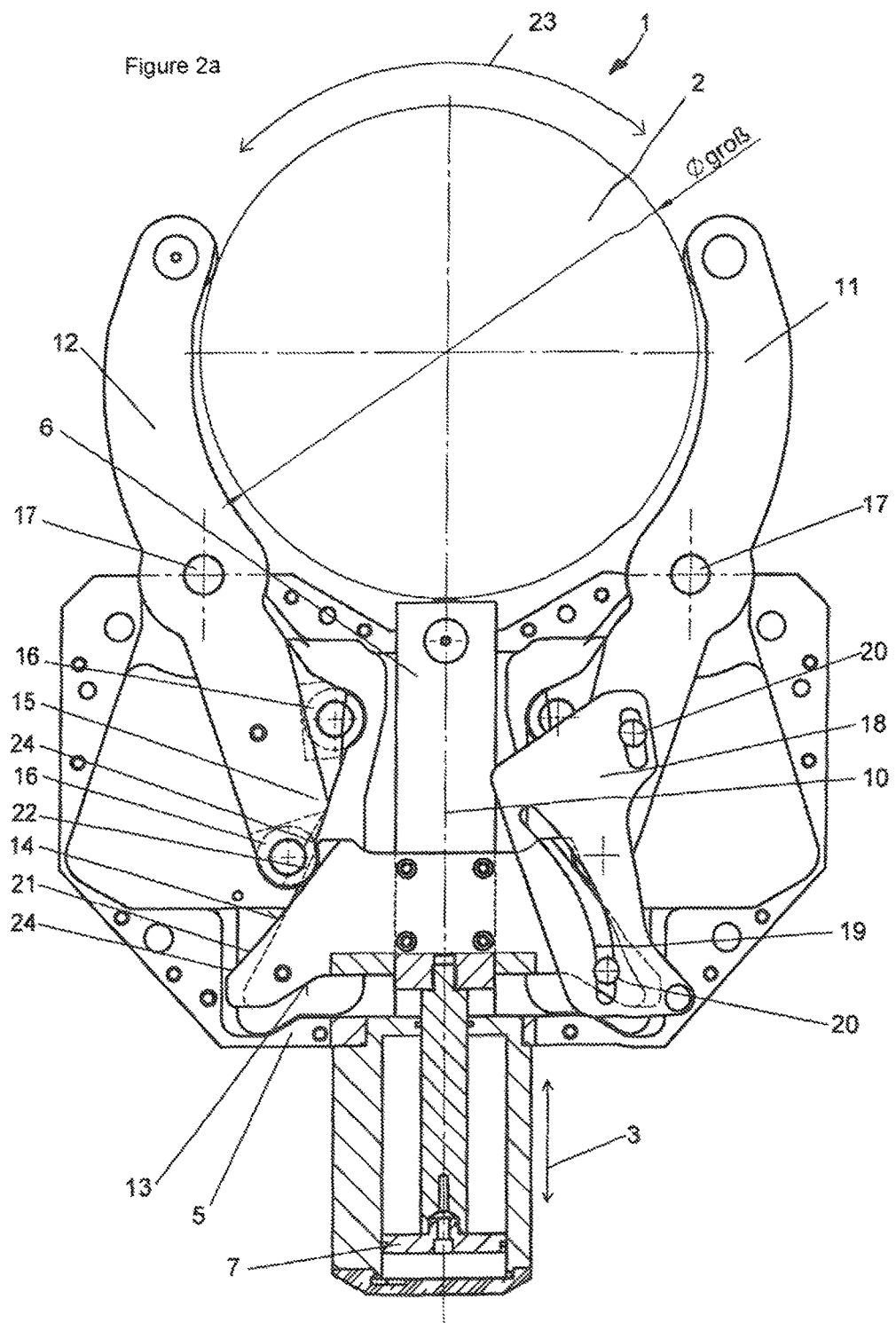
FIG. 2a shows the steady rest in accordance with FIG. 1, in a first position for a workpiece with a differently sized diameter to be clamped, in a section view.

FIG. 2a shows that two rollers 16 are provided spaced apart from one another on the free ends 15 of the outer steady rest arms in 11, 12.

The control track 14 is formed in two control sections 21 and 22 as well as a transitional area 24 positioned between the two control sections 21 and 22. One each of the rollers 16 of the steady rest arms 11, 12 is assigned to one of the control sections 21 or 22 and is in a driving connection with it. The roller 16 that is furthest away from the workpiece to makes contact with the first control section 21 and is held under preload by this, for example by a coiled compression spring or a spiral spring in the joint 17 of the outer steady rest arms 11, 12.

Figure 2B:
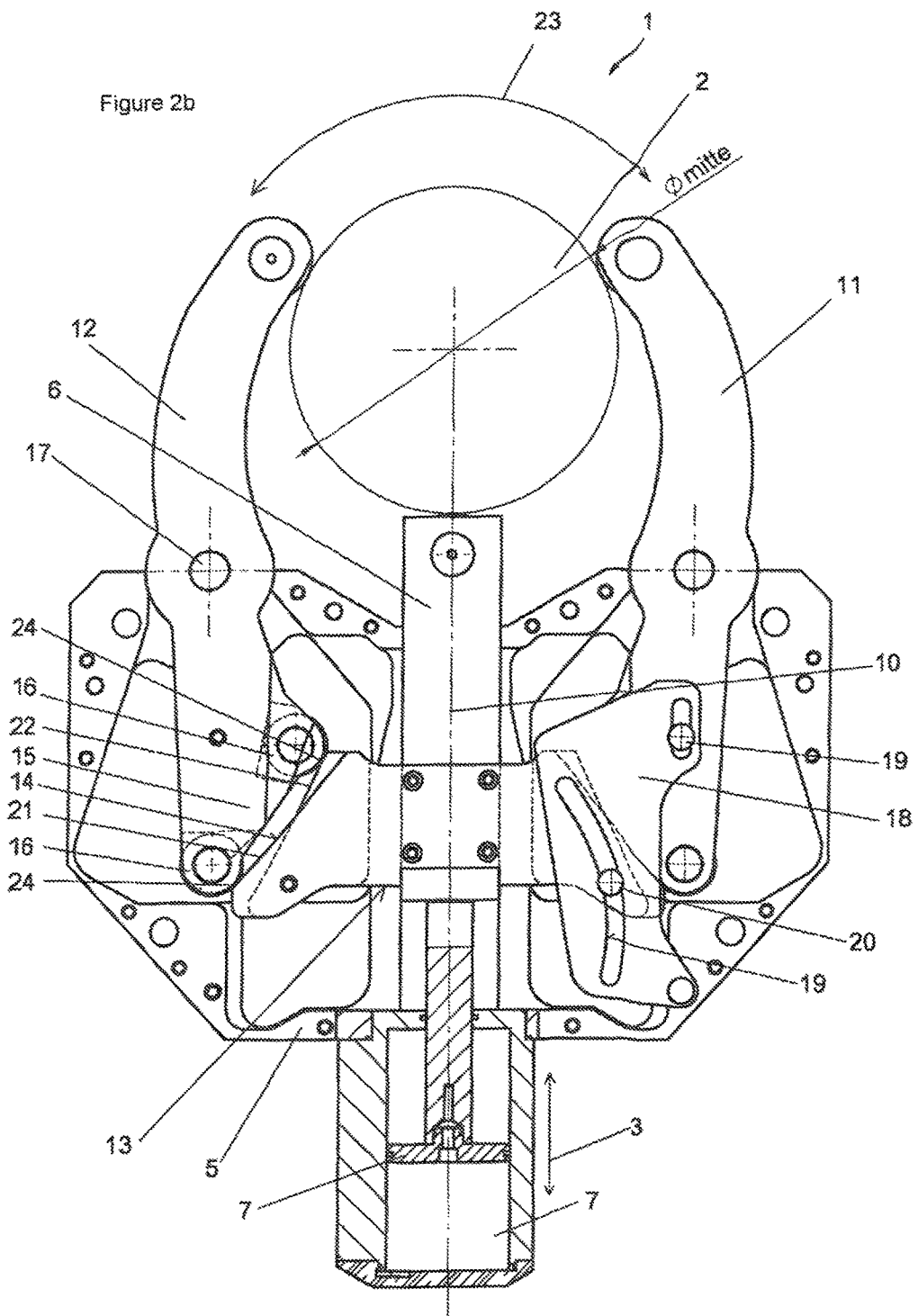
FIG. 2b shows the steady rest in accordance with FIG. 2a, in a second position for a workpiece with an average sized diameter.
Figure 2C:
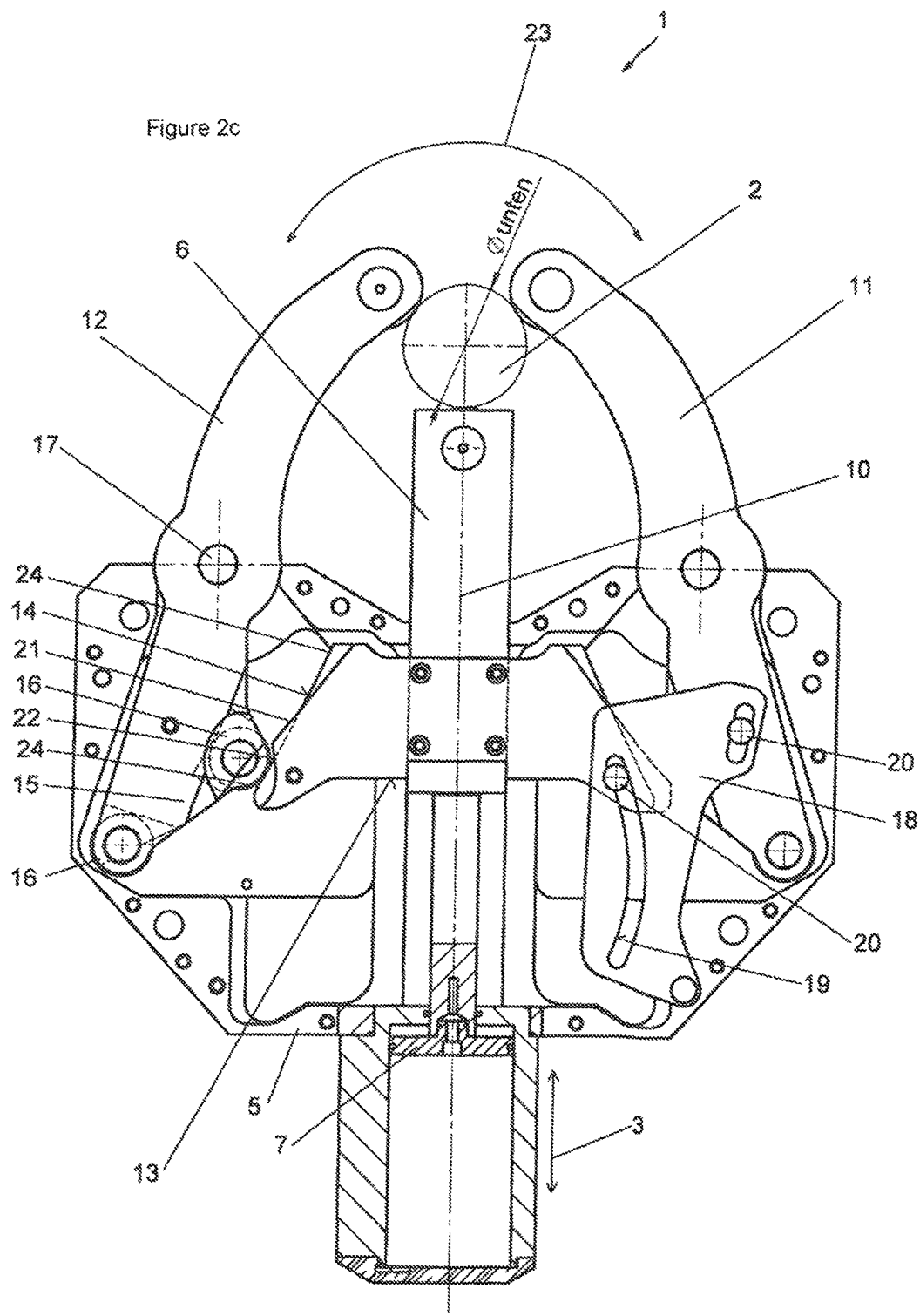
FIG. 2c shows the steady rest in accordance with FIG. 2a, in a third position for a workpiece with a small sized diameter.

Moreover, FIG. 2a shows that a workpiece 2 with a larger diameter, for example 600 mm, is clamped, with the effect that the size of the workpiece 2 specifies the position of the guide slide 13 in the housing shells 4 and 5 because the smaller the diameter of the workpieces 2 to be clamped, as is shown in FIGS. 2b and 2c, the more the position of the guide slide 13 changes in the housing shells 4 and 5.

This means the rollers 16 that are furthest away from the workpiece 2 only enter into active contact or touch the first control section 21 of the guide slide 13 in the clamped condition shown in FIG. 2a.

FIG. 2b shows a workpiece 2 with a medium diameter, for example 300 mm, in which case the position of the guide slide 13 in the housing shells 4, 5 is closer to the workpiece 2 in relation to the clamping condition of FIG. 2a. As a result, the rollers 16 of the outer steady rest arms 11, 12 that are arranged adjacent to the workpiece 2 also enter into active contact or touch the second control section 22 that are assigned to them. In this clamping condition, both rollers 16 of the outer steady rest arms 11 and 12 that are spaced apart from one another are in contact with their corresponding control section 21 or 22, and they transfer the clamping forces generated by the actuation piston 7 via the guide slide 13.

FIG. 2c is intended to show that even small workpieces 2, for example with a diameter of 80 mm, can be reliably clamped using the steady rest 1 in accordance with the present invention. The guide slide 13 in the housing shells 4 and 5 in the case of these workpieces 2 is positioned closest to them, which means that exclusively the rollers 16 adjacent to the workpiece 2 are touching or enter into in active contact with their second control section 22, and the rollers 16 located further away are no longer in active contact with the guide slide or with the first control section 21 worked on to it there.

The inclinations of the two adjacent control sections 21 and 22 are correspondingly different in relation to the longitudinal axis 10. Consequently, the control sections 21 and 22 have different pitch or inclination angles, leading to the situation in which the swivelling movement of the outer steady rest arms 11 and 12 is changed automatically depending on the control sections 21 or 22 that are in active contact or whether the rollers 16 are positioned either on the control section 21 or 22. As a result of this design embodiment of the control track 14, the situation is achieved in which differently sized workpieces 2 can be supported with one steady rest 1 without the space taken up by the steady rest 1 being changed in relation to steady rests of prior art. It is solely the design embodiment of the inclinations or pitches of the control sections 21, 22 which increases the size of the swivelling range as indicated by the reference number 23 for the outer steady rest arms 11 and 12.

Figure 3:
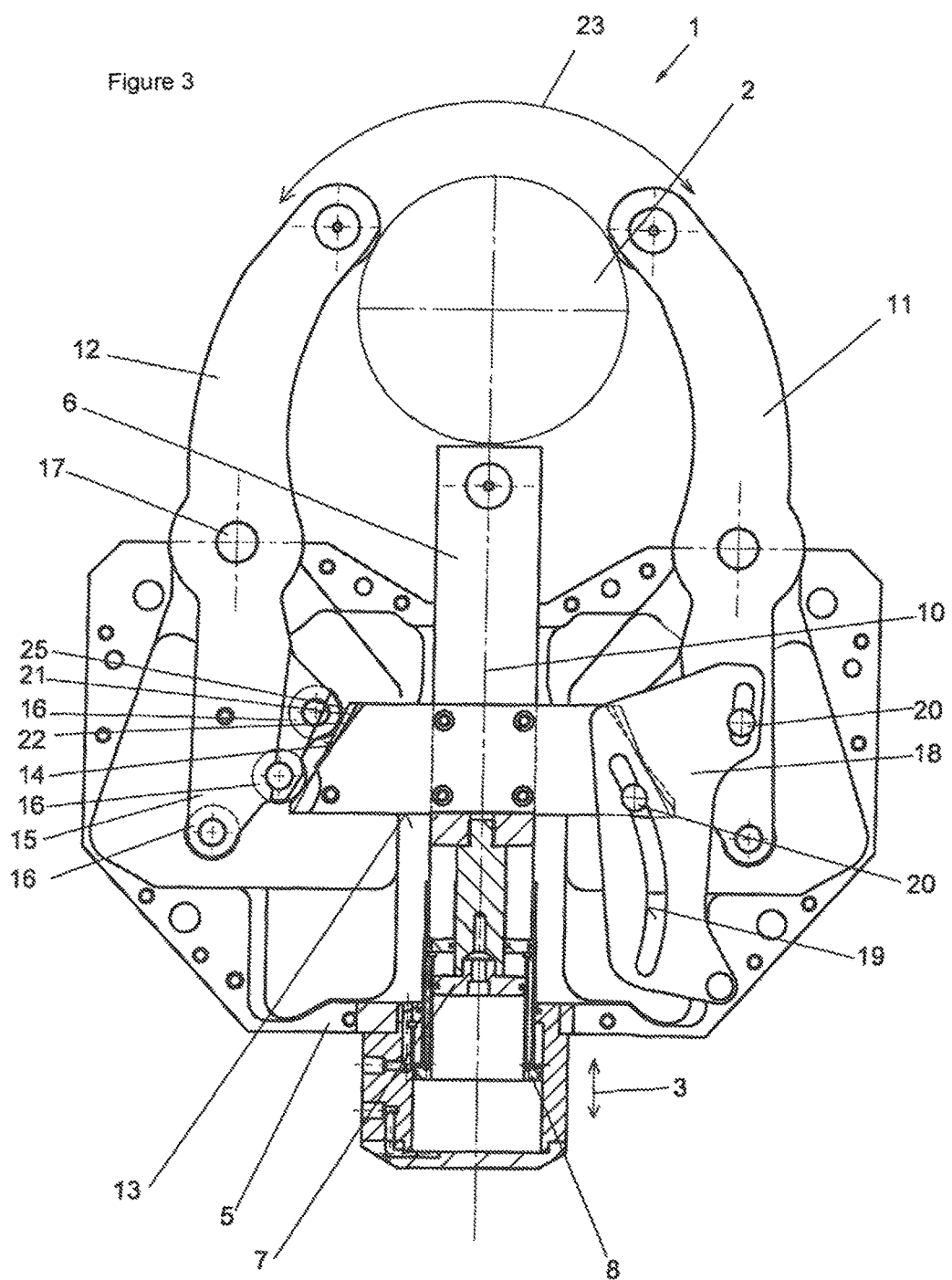
FIG. 3 shows a second sample embodiment of a steady rest with two housing shells, between which an actuation piston, a guide slide and a middle steady rest arm are mounted in an axially moving arrangement, and with two outer steady rest arms that are in a driving connection with the guide slide, in a section view.

FIG. 3 shows a steady rest 1 with a guide slide 13 which has a control track 14 with three control sections 21, 22 and 25. The free ends 15 of the outer steady rest arms 11, 12 consequently have three rollers 16 arranged spaced apart from one another, each of which is assigned to one of the control sections 21, 22 or 25 and are in active contact with it as soon as the corresponding position of the guide slide 13 is reached.

All control tracks 14 in FIGS. 1 to 3 share the feature that the length of the control track 14 approximately corresponds to the gap between two adjacent rollers 16 or the length formed by the two outer rollers 16.

A plurality of differently configured control sections 21, 22 or 25 can be worked on to the guide slide 13, with a linear, concave or convex curved or undulating profile, depending on the required swivelling range 23 of the outer steady rest arms 11, 12 in the particular control section 21, 22 or 25.

FIGS. 2a, 2b and 2c also show that a recovery device 18 is attached to the guide slide 13, i.e. it is in a driving, active connection with it. The recovery device 18 has a guide groove 19 with a pin 20 inserted into it, which is firmly connected to the particular outer steady rest arms 11 or 12. As soon as the guide slide 13 has been pulled back accordingly, a recovery force is transferred via the pin 22 of outer steady rest arms 11, 12, by means of which the pin 20 is deflected inwards due to the internal contour of the guide groove 19 of the recovery device 18, meaning that the outer steady rest arms 11, 12 are opened outwardly or swivelled about the joint 17.

Moreover, the actuation piston 7 has a telescopic configuration. Consequently, the actuation piston 7 consists of a first part 31 and a second part 32 which move in relation to one another, because each part 31 or 32 of the actuation system seven is assigned to a pressure space 33 or 34 which are separated from one another. Lines 35 emerge in each of the two pressure spaces 33 and 34, and the lines can be filled or drained by means of a control device or a pump which provides a pressurised fluid such as hydraulic oil. As soon as hydraulic oil is forced into the first pressure space 33 by means of the pump, the first part 31 of the actuation piston 7 moves towards the workpiece 2 and the second part 32 moves at the same time. The movement travel or stroke travel of the first part 31 of the actuation piston 7 provided in the pressure space 33 is limited by a stop 36. Consequently, as soon as the end position of the first part 31 of the actuation piston 7 on the stop 36 has been reached, hydraulic oil is pressed into the second pressure space 34, with the effect that the second part 32 of the actuation piston 7 is moved in the direction of the workpiece 2, meaning that the actuation travel of the steady rest arms 6, 11 and 12 that may still have to be covered is traversed and, secondly, the necessary clamping force is generated on the three steady rest arms 6, 11 and 12.

As a result of the telescopic arrangement of the actuation piston 7, the space required for this is significantly reduced while retaining the necessary length of the stroke travel.

What is claimed is:
1. A steady rest (1) for centering a rotationally symmetrical workpiece (2) in a space,
consisting of:
two housing shells (4, 5) arranged at a distance from one another and firmly connected together,
a middle steady rest arm (6) arranged between the two housing shells (4, 5) that is mounted in the housing shells (4, 5) by means of an actuation piston (7) so as to be moved in an axial direction (3) towards the workpiece (2), and
two outer steady rest arms (11, 12) that are in a driving connection with the middle steady rest arm (6) by means of a guide slide (13) which has a control track (14) on two opposite outside sides of the glide slide (13), on which at least two rollers (16) attached to free ends (15) of both outer steady rest arms (11, 12) are arranged to roll along the control track (14),
characterized in that,
the particular control track (14) of each side of guide slide (13) has at least two control sections (21, 22, 25) and that the at least two rollers (16) are spaced apart from one another and are provided on the particular free ends of each outer steady rest arm (11, 12), the at least two rollers being in an active contact with each one of the at least two control sections (21, 22, 25) depending on the position of the guide slide (13) in the housing shells (4, 5).

2. The steady rest in accordance with claim 1, characterized in that,
the at least two control sections (21, 22, 25) of the particular control track (14) have a different pitch or gradient in relation to one another and a longitudinal axis (10) of the housing shells (4, 5), and that a transitional area (24) between two adjacent control sections (21, 22 or 25) of the particular control track is configured in such a way that, in the transitional area (24), the at least two rollers (16) of one of the outer steady rest arms (11 or 12) make simultaneous contact with the particular control sections (21, 22 or 25).

3. The steady rest in accordance with claim 2, characterized in that,
the axial direction movement of the middle steady rest arm on which the guide slide (13) is being disposed generates the active contact of the at least two rollers (16) against the particular control sections (21, 22, 25) of the control track (14), and that the contact between a roller (16) from the at least two rollers, located axially furthest away from the workpiece (2) is disconnected as soon as the guide slide (13) axially advances further in the direction of the workpiece (2).

4. The steady rest in accordance with claim 1, characterized in that,
the length of the control track (14) approximately corresponds to a distance between two adjacent rollers (16) on a particular outer steady rest arm (11, 12).

5. The steady rest in accordance with one claim 1, characterized in that,
radially outside sides of each control section of the guide slide (13) forming the control track (14) are each inclined each at a different inclination angle, and that the control tracks (14) located radially opposite from each other on the guide slide (13) have in principle a V-shaped external contour, wherein a tip of the V-shaped contour lies on the longitudinal axis (10) and is adjacent to the workpiece (2) to be clamped.

6. The steady rest in accordance with claim 1, characterized in that,
the particular control section (21, 22, 25) is configured in a straight line, with a concave or convex curvature, or is undulating.

7. The steady rest in accordance with claim 1, characterized in that,
the two outer steady rest arms (11, 12) are mounted on a joint (17) in a rotating arrangement on the housing shells (4, 5), and that the joint (17) is disposed between the guide slide (13) and the workpiece (2) to be clamped.

8. The steady rest in accordance with claim 1, characterized in that, the two outer steady rest arms (11, 12) are preloaded by a force of a spiral spring or a coiled compression spring, by means of which each of the at least two rollers (16) on each of the steady rest arms (11, 12) is pressed in a direction towards each of the at least two control sections of the control track (14) of the guide slide (13).

9. The steady rest in accordance with claim 1, characterized in that, the actuation piston (7) is formed from a first part (31) and a second part (32) which are mounted one inside the other in a telescoping arrangement, and that the first and second parts (31, 32) of the actuation piston (7) are each allocated to pressure spaces (33 or 34) which are each separated from one another.

10. The steady rest in accordance claim 9, characterized in that, the two pressure spaces (33 and 34) can be filled with a pressurized medium or emptied independently from one another, and that the two parts (31 or 32) of the actuation piston (7) are capable of moving independently from one another.

11. The steady rest in accordance with claim 10, characterized in that, an adjustment travel or stroke travel of the first part (31) of the actuation piston (7) is limited by a stop (36).

12. The steady rest in accordance with claim 1, characterized in that, a swivelling range (23) of the two outer steady rest arms (11, 12) and the axial direction movement of the middle steady rest arm (6) are of a size such that workpieces (2) with diameters from 80 to 600 mm are capable of being clamped.

* * * * *